June 20, 1939.  W. S. WOLFRAM  2,162,873
CLUTCH
Filed March 11, 1938   2 Sheets-Sheet 1

Inventor
William S. Wolfram
By
Blackmore, Spencer & Flint
Attorneys

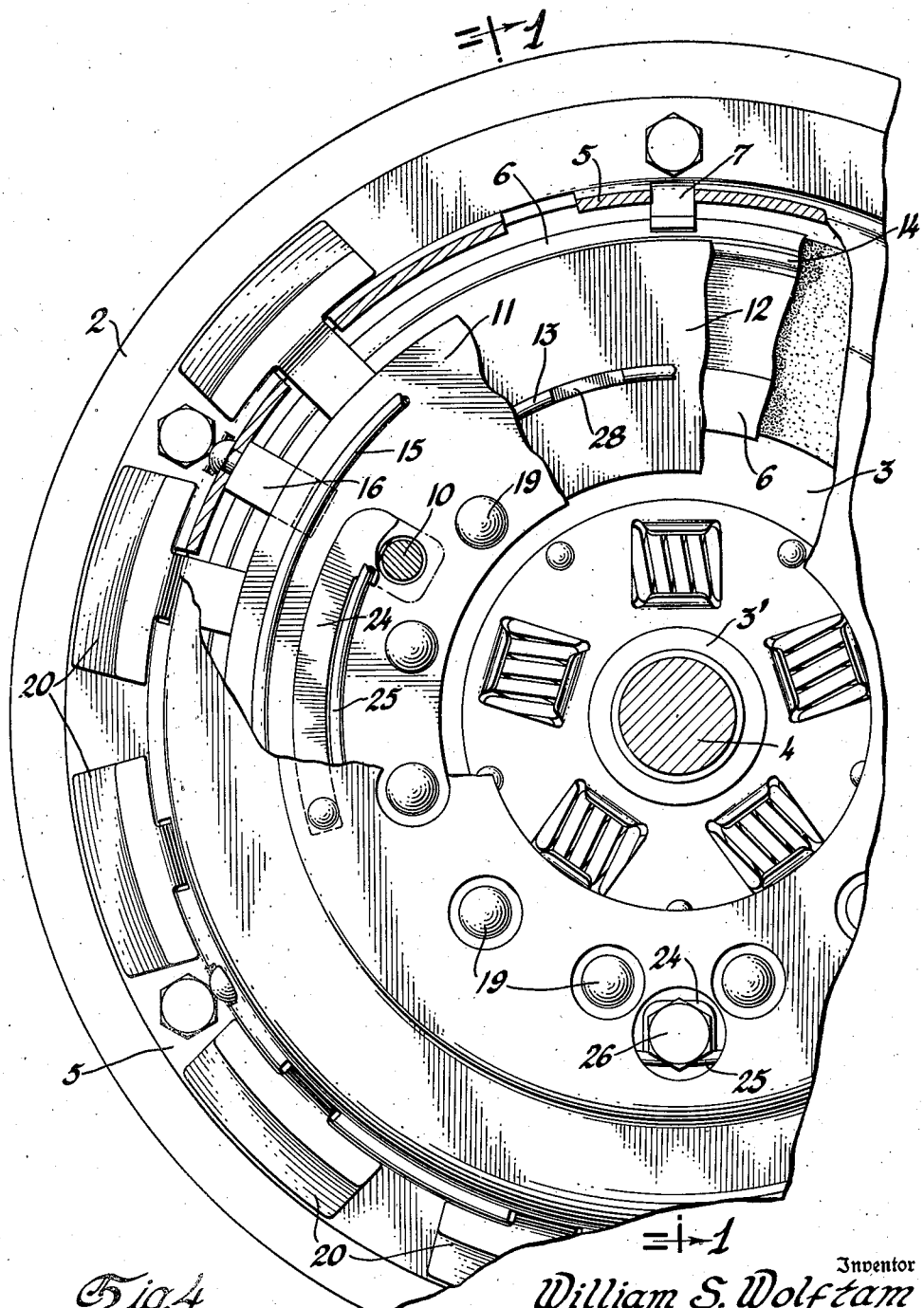

Patented June 20, 1939

2,162,873

UNITED STATES PATENT OFFICE 2,162,873

CLUTCH

William S. Wolfram, Dayton, Ohio, assignor to General Motors Corporation, Detroit, Mich., a corporation of Delaware Application March 11, 1938, Serial No. 195,291

5 Claims. (Cl. 192—103)

This invention relates to friction clutches for transmitting the drive from a driving shaft to a driven shaft, and particularly to such clutches which are automatically engaged by centrifugal force dependent on the speed of the driving shaft.

It relates particularly to such clutches in which the masses which are subject to movement under the influence of centrifugal force are operative in conjunction with dished sheet steel springs of the so-called Belleville washer type to effect engagement and disengagement of the clutch.

By suitable dimensioning, and proportioning of the extent to which a Belleville washer is dished to the thickness of the material of which it is made, a buckling spring or a spring which may be deflected from a condition in which it exerts a force in one direction to a condition in which it exerts a force in an opposite direction, can be obtained.

One object of the invention is a clutch having a buckling spring which when buckled in one direction is effective to hold the relatively movable parts of the clutch in a disengaged position and when buckled in the opposite direction is effective to hold the parts in an engaged position.

Another object of the invention is a clutch in which buckling of the spring in a direction to effect engagement of the clutch is resiliently resisted by a biasing spring yieldingly urging the buckling spring in a direction to effect disengagement of the clutch.

Another object of the invention is an automatic clutch in which the buckling spring is deflected by speed responsive means from a condition in which it holds the parts in a disengaged position to a condition in which it tends to hold the parts in an engaged position.

A still further object of the invention is an automatic clutch in which at higher speeds, the speed responsive means exert a force assisting the buckling spring to overcome the biasing spring and hold the parts in an engaged position.

The above and other objects of the invention will be apparent as the description proceeds.

The drawings show the application of the invention to a disc type centrifugal clutch.

In the drawings

Fig. 4 is a front view of the clutch with parts broken away.

Figure 1:
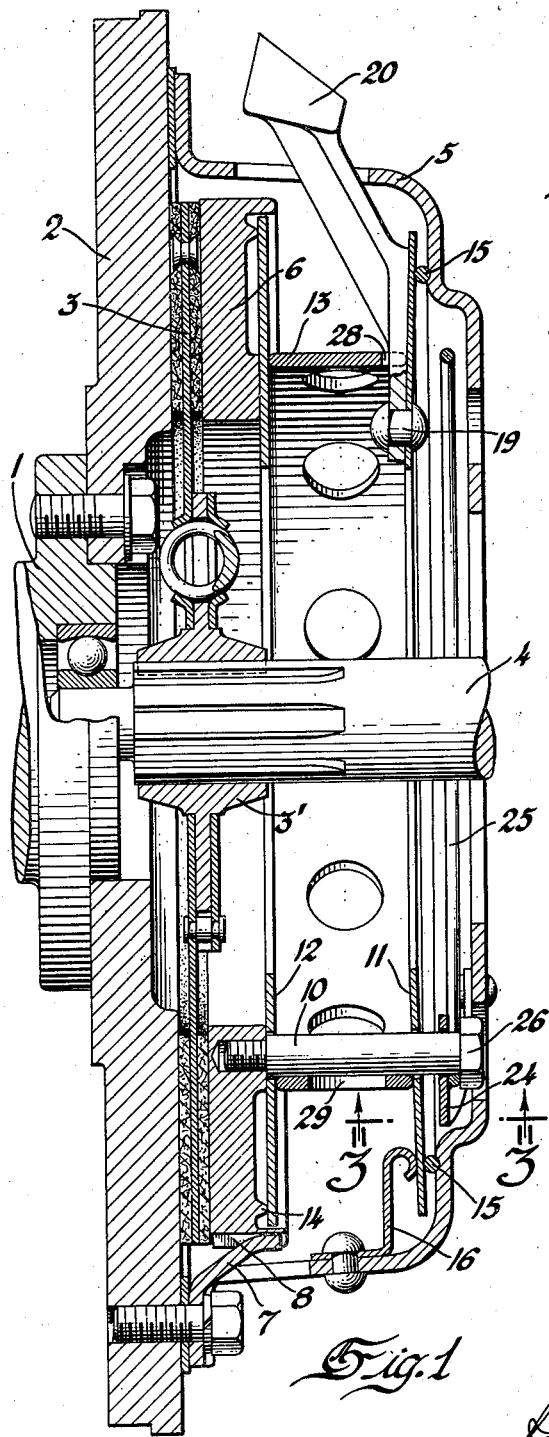
Fig. 1 is a sectional view on line 1—1 of Fig. 4 of a clutch according to the invention, the parts being shown in the engaged position.

The driving shaft 1 is provided with the driving disc member 2 which in the example illustrated, is an engine flywheel. 3 is the driven disc member having a hub 3' splined on the driven shaft 4. Rigidly bolted to the driving disc is the clutch cover 5.

The pressure plate 6 is driven from the clutch cover 5 through suitable indentations 7 thereof, engaging grooves 8 in the periphery of the pressure plate, and is capable of axial sliding movement relative to the clutch cover 5. The pressure plate is provided with a plurality of guide posts consisting of bolts such as 10, for Belleville washer springs 11 and 12, separated by a spacing ring 13. The Belleville washer spring 11 is a buckling spring and the Belleville washer spring 12 is a biasing spring.

The relative diameters and thicknesses of the springs 11 and 12 and the degree to which they are coned or dished is such that the spring 12 is somewhat stronger than spring 11. The spring 11 in its free condition is coned or dished in the direction shown in Fig. 1, but considerably more so. The spring 12 in its free condition is coned or dished in the direction shown in Fig. 2, but slightly more so.

The biasing spring 12 has an abutment constituted by an annular bead 14 on the pressure plate 6, and the buckling spring 11 is clamped to an abutment or fulcrum ring 15 in an annular groove in the clutch cover 5, by a plurality of retaining springs such as 16.

Rigidly secured to the buckling spring 11, as by rivets 19 at points close to its inner periphery, are a plurality of flyweights 20, suitably spaced and disposed radially of the spring 11, so that when the driving shaft is running, the flyweights have a centrifugal moment and there is a resultant spring deflecting force capable of deflecting the inner periphery of the spring—relatively to its clamped outer periphery—towards the pressure plate, against the pressure of the biasing spring 12.

A number of leaf springs 24 have one end riveted to the clutch cover 5, with their opposite ends bearing against a ring 25 which engages the heads 26 of the guide posts 10. The springs 24 tend to maintain the pressure plate in a position intermediate of its fully engaged and fully disengaged positions, thereby cushioning engagement and disengagement of the clutch.

The spacing ring 13 serves to transmit the pressure of the biasing spring 12 to the buckling spring 11, and to transmit the pressure of the spring 11 plus the spring deflecting force of the flyweights 20 through the spring 12 to the clutch pressure plate 6.

Figure 3:
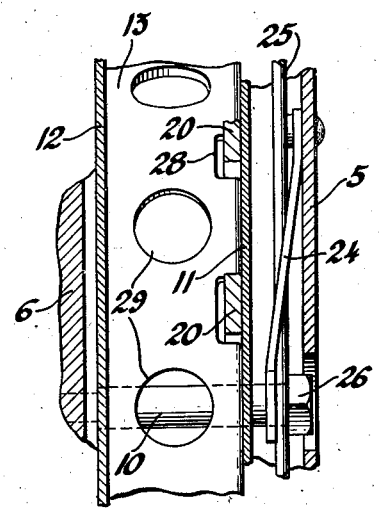
Fig. 3 is a view on line 3—3 of Fig. 1.

As shown most clearly in Fig. 3, the spacing ring 13 is cylindrical in shape, with rounded edges, and is notched as at 28 to clear the weights. It is provided also with a number of ventilating holes such as 29.

Figure 2:
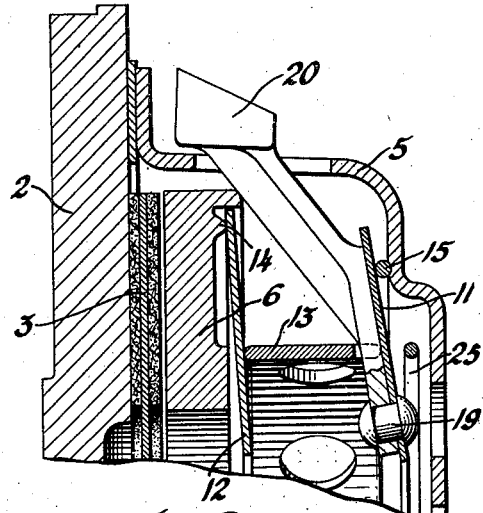
Fig. 2 is a view of a part of Fig. 1 showing the parts in the disengaged position.

As assembled, with the clutch disengaged and inoperative as shown in Fig. 2, the spring 11 is coned in a direction opposite to its free condition. Acting on the buckling spring 11 through the spacer ring 13, the biasing spring 12 is sufficiently stronger than the buckling spring 11 to force it over center or past a flat condition, to a position in which it is coned as shown in Fig. 2.

In this condition the spring 11 is reacting against the retaining springs such as 16, and, thrusting against the heads 26 of the posts 10 through the cushion springs 24 and the ring 25, holds the pressure plate 6 away from the driven disc 3, and the clutch disengaged. The spring 11 and the spring 12 are both under a slight initial load with the former holding the clutch disengaged, while the latter is acting directly on the pressure plate 6 through the annular bead 14 thereon, and reacting indirectly on the pressure plate through the spacer ring 13, spring 11, springs 24, ring 25 and the heads 26 of the posts 10, so that, of itself, it is without effect on the position of the pressure plate 6.

When the driving shaft 1 is turned at a sufficient speed, the centrifugal moment of the flyweights 20 overcomes the force of spring 11 tending to hold the clutch disengaged, moves the pressure plate 6 into contact with the driven disc 3 and the latter into contact with the driving disc 2 and then forces the spring 11 over center or past its flat condition after which the direction of force of this spring is reversed and added to that due to the centrifugal moment of the flyweights 20. The sum of these forces is transmitted through the spacer ring 13 to the spring 12, and thence to the pressure plate 6 through the annular bead 14 thereon, to hold the clutch in engagement.

When the speed is reduced and the sum of the force of spring 11 and that due to the centrifugal moment of the flyweights 20 becomes less than the force of spring 12, the latter, through the spacer ring 13, forces spring 11 over center or past its flat condition, to a position in which the direction of its force is reversed and the clutch is disengaged.

It will be seen that the pressure of the biasing spring 12, and the forces due to the centrifugal moment of the flyweights 20, oppose one another and differentially control the direction of thrust of the buckling Belleville washer spring 11 on the pressure plate 6 and together control the automatic engagement and disengagement of the clutch as the speed of the driving member rises and falls. The clutch may for instance be designed to be fully disengaged at speeds below 400 R. P. M. and fully engaged at speeds above 800 R. P. M.

I claim:

1. In a clutch mechanism, parts relatively movable to engage and disengage the clutch, a buckling spring capable of being deflected from a condition in which it is effective to hold the parts in a disengaged position to a condition in which it tends to hold the parts in an engaged position, and means for deflecting said buckling spring to the last named condition against the pressure of a biasing spring resiliently urging the buckling spring towards the first named condition; said means and said buckling spring together exerting a force transmitted through the biasing spring, to hold the clutch engaged.

2. The combination according to claim 1 in which the buckling spring and the biasing spring are both Belleville washer springs.

3. The combination according to claim 1 in which the buckling spring is a Belleville washer and the means for deflecting said buckling spring to a condition in which it tends to hold the parts in an engaged position consists of a plurality of flyweights rigidly secured to the buckling spring at points close to its inner periphery and having a centrifugal moment such that there is a resultant force capable of deflecting the spring in the required direction.

4. In a clutch mechanism, a driving member; a driven member; a buckling Belleville washer spring operative in one condition to yieldingly urge the driving member and the driven member into driving engagement, and in another condition to separate the driving member from the driven member and disengage the clutch; and a biasing spring and speed responsive means differentially controlling the said conditions of the buckling spring.

5. In a clutch mechanism, a driving member, a driven member, a pressure plate mounted to rotate with the driving member but movable into and out of engagement with the driven member to engage and disengage the clutch, a buckling spring capable of urging the pressure plate in opposite directions, towards and away from the driven member to engage and disengage the clutch, a biasing spring urging the buckling spring in a direction to move the pressure plate away from the driven member and means responsive to the speed of the driving member to urge the buckling spring in a direction to move the pressure plate into engagement with the driven member.

WILLIAM S. WOLFRAM.